Patented July 13, 1926.

1,592,394

UNITED STATES PATENT OFFICE.

NATHAN SULZBERGER, OF NEW YORK, N. Y.

COPYING AND PRINTING PAPER AND METHOD OF USE.

No Drawing.   Application filed August 15, 1922.   Serial No. 582,087.

In order to obtain copies of printed matter, etc., some photographic method of reproduction is generally resorted to. Such methods of reproduction take time and involve more or less tedious work.

I have found that in many instances an accurate copy of the desired matter may be obtained by simply pressing a suitable, more or less absorbent asbestos material under proper conditions against the matter to be copied, whereby practically instantaneously a copy is made.

In the following specific description, I will give, as an example, a specific illustration of my invention:

Over a rotary photogravure picture (such as the rotary photogravure pictures of the Sunday issue of the New York Times) was placed a thin piece of asbestos paper, made as hereinafter described, and a soft piece of cloth dipped in benzol was carefully pressed against the asbestos paper until the picture appeared through. The asbestos paper was then removed, most of the benzol having evaporated, and showed clearly the picture in a sepia tone, resembling the original in all detail.

The asbestos paper which I have found particularly advantageous is made from asbestos fibre with colloidal aluminum silicate, as a binder. Aluminum silicate is a salt-like compound or combination of alumina and silica, and, in a colloidal state, has valuable properties as a binder. One suitable method of making such asbestos paper is more fully described in my companion application Ser. No. 465,700, filed April 30, 1921, which has matured into Patent 1,581,618. When asbestos paper of this character was treated in the manner above described, the picture was readily copied thereon.

By treating the picture, produced as above described, with sodium silicate solution of proper strength, the picture can be made transparent, or translucent, so that any reading matter, copied along with the picture will appear correctly, if the picture is viewed from the side which was not pressed against the picture copied.

Such a picture made on asbestos paper, either with or without subsequent treatment with sodium silicate, will not burn with a flame, and will not ignite when a match is applied to it. The asbestos paper itself is non-combustible, and pictures made thereon are therefore permanent, provided the pigment or material copied contains inorganic material such as is commonly used in printing pigments, e. g., iron oxide or hydrated iron oxide.

When the mixture is treated with sodium silicate to make it transparent, the material may then be used for other purposes, for example, such as lamp shades, Japanese lanterns, etc., and it may, in certain cases, be used by placing it on the lamp bulbs themselves, the asbestos material being resistant to the temperature to which it is subjected when directly placed on the lamp bulb.

The picture can also if desired be waterproofed by treating with a cellulose ester solution or by other suitable water-proofing means.

Instead of using benzol for the copying, other suitable solvents may be used, such as carbon tetrachloride ("carbona"), turpentine, etc. Copies of any matter printed and prepared with ink or color which readily dissolves in the solvent chosen may be used. So also, in certain cases, more than one copy may be obtained, particularly when the original is specially prepared for this copying process.

In carrying out the copying, it is well not to use too much of the solvent, so as to avoid blurred effects.

Instead of using sodium silicate, other agents may in certain cases be used, for example, where a final product is not required to be non-inflammable, a material such as shellac may be used to produce transparency. When shellac is applied to asbestos paper of the character described, and particularly where the asbestos paper has been prepared with colloidal aluminum silicate, the result is to give a paper which may be translucent or even transparent, as more fully described in my prior application, Serial No. 505,097, filed October 3, 1921, which has matured into Patent 1,556,973.

By the method of the present invention a copy of the desired matter can be obtained in a very short time. As much as desired of the picture may be copied, and part may be picked out from among the rest, or certain pictures picked out from among several. So also, where only the reverse of the picture is desired, it may appear only on one side of the asbestos paper, and the back of the picture may remain white and free from any material if so desired. So also, the picture may have other material printed on its back, or the original of which the copy is made may have other matter printed so that it will be reproduced at the same time.

The method of the present invention may also be used as an amusing pastime and game. It is so simple that any child can prepare pictures safely in this way, and especially if a non-inflammable solvent is used.

Asbestos paper is particularly adapted for use because of its non-inflammable character and because it can readily be made transparent so as to allow the copying and easy reading of reading matter.

If very thin paper or fabric is used, the same may be strengthened by pasting it on other material, such as thicker paper, cardboard, etc. The copying material may also be colored. A combination of desired matter may be obtained on the same piece of paper by subsequent treatment. Various ingredients such as gummy substances, etc., may be added for giving different effects or different appearances to the picture. Thus glycerine will improve the pliability of the transparent paper, e. g. that in which sodium silicate is used together with the asbestos.

In so far as I am aware, asbestos paper has not heretofore been used, or considered available for use, for making copies of printed and other matter. I have found, however, that the thin asbestos paper, properly prepared, has a sufficient strength to permit it to be used, and has a sufficient absorptive power to take up the material to be transferred and to hold it and give a reproduction of the desired printed matter or picture. While the ink or the like usually contains organic matter, it also usually contains inorganic pigments or compounds, and particularly iron compounds. When iron compounds are present and are transferred to the asbestos paper, the heating of the paper may destroy the organic matter, but it will leave the iron oxide either as such or in combination with the asbestos, and the picture or printed matter will in this way be preserved even when subjected to conditions which would completely destroy ordinary paper.

I claim:

1. The method of copying printed and other matter which comprises placing over the matter to be copied a sheet of absorbent asbestos material, and applying a solvent for the ink or color of the matter to be copied, whereby when the ink or color to be copied is brought in contact with the asbestos sheet and the solvent, the sheet will absorb sufficient of the ink or color, thereby producing a copy of the printed and other matter and thereafter treating with sodium silicate and glycerine.

2. The method of copying printed or other matter which comprises placing over the matter to be copied a thin sheet of asbestos paper of an absorbent character, and moistening the same with a solvent for the printed or other matter until the picture appears through the asbestos paper and thereafter making the sheet transparent.

3. The method of copying printed and other matter prepared with soluble ink, which comprises placing thin asbestos paper over the matter to be copied and moistening the asbestos paper with benzol and then treating the product so obtained with sodium silicate and a cellulose ester solution.

4. The method of copying printed or other matter which comprises placing over the matter to be copied a thin sheet of asbestos paper containing colloidal aluminum silicate and moistening the same until the picture appears through the paper and thereafter making the sheet transparent and water-proof.

5. The method of copying printed or other matter which comprises placing over the matter to be copied a thin asbestos paper, applying a solvent to transfer the matter to the asbestos paper, and treating the resulting picture or reproduction by applying thereto a solution of sodium silicate.

6. The method of copying printed and other matter which comprises placing over the matter to be copied a thin asbestos paper, applying a solvent to transfer the matter to the asbestos paper, and subsequently treating the asbestos paper by applying thereto a varnish to make the sheet transparent.

7. The method of making copies of printed and other matter which comprises transferring the image of the material to be copied to a sheet of asbestos paper and fixing the image thereon in permanent form.

8. A flexible transparent sheet of asbestos with an image thereon.

9. A designed transparent and parchment-like non-inflammable sheet.

10. A non-inflammable printed flexible manufactured transparent sheet.

11. A water-proof transparent asbestos base bearing an image.

12. A printed asbestos sheet treated to become transparent.

NATHAN SULZBERGER.